US012036429B2

(12) United States Patent
Kadoche

(10) Patent No.: US 12,036,429 B2
(45) Date of Patent: Jul. 16, 2024

(54) DRY DROP FOR A FIRE EXTINCTION VACUUM NETWORK

(71) Applicant: EXEC, Goussainville (FR)

(72) Inventor: Maurice Kadoche, Coubron (FR)

(73) Assignee: EXEC, Goussainville (FR)

( * ) Notice: Subject to any disclaimer, the term of this patent is extended or adjusted under 35 U.S.C. 154(b) by 641 days.

(21) Appl. No.: 17/275,901

(22) PCT Filed: Aug. 6, 2019

(86) PCT No.: PCT/FR2019/051907
§ 371 (c)(1),
(2) Date: Mar. 12, 2021

(87) PCT Pub. No.: WO2020/053495
PCT Pub. Date: Mar. 19, 2020

(65) Prior Publication Data

US 2021/0260419 A1 Aug. 26, 2021

(30) Foreign Application Priority Data

Sep. 14, 2018 (FR) ....................................... 1858320

(51) Int. Cl.
*A62C 3/00* (2006.01)
*A62C 37/12* (2006.01)

(52) U.S. Cl.
CPC .............. *A62C 3/004* (2013.01); *A62C 37/12* (2013.01)

(58) Field of Classification Search
CPC ......... A62C 35/62; A62C 3/004; A62C 37/20; A62C 37/11-16

(Continued)

(56) References Cited

U.S. PATENT DOCUMENTS 7,516,800 B1 * 4/2009 Silva, Jr. ................ A62C 35/62 169/17
8,327,946 B1 * 12/2012 Silva, Jr. ................ A62C 35/62 169/17

(Continued)

FOREIGN PATENT DOCUMENTS

FR 3002152 A1 8/2014

OTHER PUBLICATIONS

International Search Report dated Apr. 14, 2020 for corresponding International Application No. PCT/FR2019/051907, Aug. 6, 2019.

(Continued)

*Primary Examiner* — Cody J Lieuwen
(74) *Attorney, Agent, or Firm* — David D. Brush; Westman, Champlin & Koehler, P.A.

(57) ABSTRACT

A dry drop to be mounted in a fire protection installation of the type having a network of vacuum sprinklers. The dry drop includes a tubular body, a shutter and a one-way valve. The tubular body defines an inner chamber and has: a first end; a second end; and an orifice located between the first end and the second end. The shutter is movable between: a shutoff position in which it shuts off the first nozzle; and a passage position in which it is cleared from the first nozzle. The one-way valve is intended to be mounted in the orifice to enable the pressurization of the inner chamber by injection of a gas into the inner chamber, the inner pressure holding the shutter in its shutoff position.

8 Claims, 4 Drawing Sheets

(58) Field of Classification Search
USPC .................................................. 169/17, 57
See application file for complete search history.

(56) References Cited

U.S. PATENT DOCUMENTS

| | | | | |
|---|---|---|---|---|
| 9,526,935 | B2 | 12/2016 | Kadoche | |
| 2003/0075343 | A1 * | 4/2003 | Ballard | A62C 3/004 169/37 |
| 2013/0199803 | A1 * | 8/2013 | Multer | A62C 35/68 169/17 |
| 2015/0375024 | A1 * | 12/2015 | Kadoche | A62C 35/68 169/41 |

OTHER PUBLICATIONS

Written Opinion of the International Searching Authority dated Apr. 14, 2020 for corresponding International Application No. PCT/FR2019/051907, filed Aug. 6, 2019.
English translation of the Written Opinion of the International Searching Authority dated Apr. 23, 2020 for corresponding International Application No. PCT/FR2019/051907, filed Aug. 6, 2019.

* cited by examiner

DRY DROP FOR A FIRE EXTINCTION VACUUM NETWORK

CROSS-REFERENCE TO RELATED APPLICATIONS

This Application is a Section 371 National Stage Application of International Application No. PCT/FR2019/051907, filed Aug. 6, 2019, the content of which is incorporated herein by reference in its entirety, and published as WO 2020/053495 on Mar. 19, 2020, not in English.

FIELD OF THE DISCLOSURE

The field of the invention relates to the design and manufacture of firefighting equipment and installations.

More specifically, the invention concerns devices referred to by the term "dry drop", intended in particular for firefighting inside cold rooms.

BACKGROUND OF THE DISCLOSURE

The role of an automatic fire extinction installation implementing sprinklers is to detect, as soon as possible, a fire source and then automatically trigger the extinction system, at least locally, while emitting an alarm.

The installation aims at containing most of the fire, before the arrival of firefighters who then take over the installation to extinguish the fire.

In the field of the invention, firefighting installations are classified into three categories, namely:

"water" systems;

"air" systems;

"vacuum" systems.

In these three systems, the sprinklers are mounted in a network so as to be evenly distributed over the site to be protected. Conventionally, the sprinklers comprise:

- a fastening connector, allowing linking the sprinkler to a piping, this fastening connector having a nozzle intended for the passage of water to be released to extinguish the fire;
- a fuse;
- a cap for shutting off the nozzle, held in the shutoff position by the fuse.

The fuse is calibrated so as to burst when a determined temperature is exceeded, thereby releasing the nozzle from its shutoff cap.

In "water" systems, the entire piping of the installation is filled with water, up to the sprinklers. Hence, water is waiting behind the shutoff means and when the fuse bursts, water flows throughout the nozzle of the connector of the sprinkler whose fuse has burst.

Hence, the water release time is immediate (if there is no corrosion, plugging and/or clogging obstacle), which is particularly advantageous. In contrast, "water" systems are not suited for sites with icing risks. Indeed, in the event of icing, water cannot flow. In addition, icing might cause deteriorations to the piping of the installation (deformation and even break-up of the hoses). In some cases, the installation is then cleared of water. In other cases, the site to be protected is heated to avoid any risk of icing. For sites to be protected having a relatively wide area, the energy consumption, and consequently the heating cost, may turn out to be considerable, and even prohibitive. Another way to fight icing is to add an anti-freeze to the water of the installation, such as glycol which is a toxic, carcinogenic and polluting product. Moreover, the use of an anti-freeze does not nevertheless preclude the risk of icing since part of the water may freeze anyway, which may cause an obstruction preventing the spread of water in the event of a fire.

In "air" systems, the entire installation is free of water. The entire piping of the installation is maintained under pressure. When the fuses burst, the air pressure is released through the considered sprinkler(s) and water, also under pressure, tends to "push" air out of the installation until reaching the cleared orifice(s) so as to escape through the latter.

With such a system, water can, in some cases, take up to 60 seconds to reach the sprinkler whose fuse has burst, which while being compliant with the standard in force might turn out to be too long with regards to some fire outbreaks. Moreover, the time for water to arrive may be longer than 60 seconds, and therefore not compliant with the standard in force, in particular because of excessively high volume and pressure of air in the networks, air being then discharged hardly off the networks. In these cases, the fire protection is defeated.

Furthermore, "air" systems are not completely free of icing-related problems. Indeed, condensate may be created in the piping of an "air" installation, which might affect some components of the installation and defeat the protection.

In general, "water" and "air" systems have the following drawbacks:

- they are subject to plugging and, consequently, to clogging;
- they are subject to corrosion, which may of course lead to an installation that is totally or partially out of order and defeat the protection;
- they may be subject to non-visible water leakages;
- they allow the development of microorganisms in the pipes of the installation.

The result is that they need, amongst others, anti-freeze and anti-corrosion treatments (involving resort to harmful products).

Moreover, they require rinsing operations after use.

Furthermore, they involve relatively long start-up times, depending on the extent of the installation, which may range from one hour to four hours for "water" systems and two hours and more for "air" systems.

To overcome all of these drawbacks, "vacuum" systems have been designed. In "vacuum" systems, a vacuum is created in the pipes extending between a general valve and the set of sprinklers. In other words, all pipes separating the valve from the sprinklers act as vacuum permanent guard branches.

In these systems, the vacuum constitutes an active energy that serves as a functional source for monitoring the sprinklers. Indeed, if a fuse of one of the sprinklers bursts, the atmospheric pressure spreads to the entire installation, which causes a change of the state of an actuator which, in turn, opens the water supply general valve. This results in water overwhelming, rapidly and without hindrance, the entire installation up to the sprinklers, water flowing through the sprinkler(s) whose fuse has burst. The vacuum still active in the networks rapidly attracts the extinction water towards the sprinklers whose fuse has burst.

The trigger time of the actuator is very short, to the extent that, when a fuse bursts, the "vacuum" installation immediately gives rise to a phenomenon of suction of the air outside the installation. It should be noted that this suction might be beneficial, the effect of suction on the source of fire tending to reduce the intensity of the latter.

The time for water to arrive at the sprinkle whose fuse has burst is shorter than 60 seconds.

Hence, it is understood that, by the absence of water or condensate in an installation of a "vacuum" system, the following results are obtained:

no corrosion, and therefore no plugging or clogging;
the required extinction water density is guaranteed;
no development of microorganisms;
no possible water leakages (water being absent by default in the pipes of the installation leading to the sprinklers);
no need for any anti-freeze or anti-corrosion treatment;
no rinsing is necessary before start-up of the installation.

For some vacuum installations, it is necessary to provide for the implementation of dry drops, used to fight a fire likely to start in a cold room. These drops require sprinklers arranged in a down position, these sprinklers not being suited to current vacuum installations.

These dry drops ensure the link between a pipe of the network of "vacuum" sprinklers and the inside of the cold room. For this purpose, dry drops have an elongate body having at one of its ends means for connection to a piping and, at the other one of its ends, a sprinkler of the type as the previously-described one.

The height of the elongate body is dimensioned as a function of the thickness of the heat-insulating wall of the ceiling of the cold room.

Of course, this dimension of the elongate body is such that the sprinkle carried by the lower end of the dry drop extends in the inner volume of the cold room.

The design of dry drops is such that, when the network of sprinklers is flooded with water, the dry drops whose fuses have not burst are not filled with water. Indeed, even after drawing vacuum in the network of sprinklers, water could stagnate in the elongate body of a drop and would freeze, given the temperature in the cold room. Of course, this would result in the drop being defeated in the event of a fire inside the cold room for either one of the following reasons:

the atmospheric pressure would not be able to overwhelm the network of sprinklers because of the ice present in the elongate body obstructing the penetration of ambient air from the cold room;
the water would not be able to flow throughout the sprinkler, also because of the ice present in the elongate body obstructing all or part of the water flow.

To avoid this situation, dry drops include means for shutting off the link constituted by a first nozzle, between the drop and the piping carrying it. For example, these shutoff means consist of a shutter.

According to the operation of this dry drop, if the fuse of the sprinkler of the drop bursts, the cap at the level of the sprinkler is ejected, thereby causing the displacement of the shutoff means at the level of the first nozzle, so as to clear the communication between the drop and the piping carrying the drop.

In contrast, if the fuse of the sprinkler of the drop does not burst, the shutoff means at the level of the first nozzle remain in the shutoff position and insulate the drop from water present in the network of sprinklers.

Yet, according to the design of current drops and the corresponding maintenance practices, when the sprinkler of a dry drop has been triggered, the latter is replaced in its entirety.

The cost of one single dry drop being relatively considerable, this maintenance practice turns out to be particularly expensive when all of the dry drops of a cold room are to be replaced.

Moreover, the sprinklers present at the lower end of the dry drops, as well as all of the other sprinklers of a "vacuum" network, comprise, besides the fuse and the shutoff cap, means for ejecting the cap.

Indeed, as indicated before, when a fuse bursts, this gives rise to a phenomenon of suction of air towards the inside of the piping of the installation. It not constrained to leave its place, the cap remains somehow "stuck" on the mouthing of the nozzle of the connector, which does not then allow air to come in and consequently prevents the actuator from being triggered.

In order to avoid this, ejection means are mounted on each sprinkler. Conventionally, these ejection means are constituted by a spring inserted into a cylindrical part mounted in the nozzle of the sprinkler. An end of the spring bears at the bottom of the cylindrical part, whereas the other spring end bears on the shutter held in position by the fuse. Of course, the spring is in the compressed state.

With such sprinklers, undesirable situations have sometimes been observed.

Indeed, it has been observed that after burst of the fuse, the cap could remain in a partial shutoff position of the nozzle of the connector or in a position detrimental to the proper spread of water. In any case, the spring is not ejected from the nozzle and therefore remains inside the latter.

In vacuum-type firefighting installations, mounted in cold rooms, dry drops can be used only with sprinklers for vacuum networks.

The patent document published under the number FR 3 002 152, describes a dry drop intended to achieve the link between the network and the sprinkler. The dry drop comprises an inner chamber also vacuum drawn to enable holding of the cap which shuts off the nozzle of the sprinkle.

Nonetheless, in order to ensure the proper triggering of the installation in the event of a fire, it is necessary to use vacuum-type sprinkles provided with means for ejecting the cap in the event of break-up of the fuse.

SUMMARY

Hence, these vacuum sprinklers are more expensive than conventional sprinklers.

Hence, an installation using a plurality of vacuum sprinklers has a relatively high cost such that professionals might be tempted to resort to air or water installations that have the aforementioned drawbacks.

In particular, it is an objective of the invention to overcome the drawbacks of the prior art.

More specifically, it is an objective of the invention to provide a dry drop that is compatible with all types of sprinkles, whether these consist of vacuum sprinklers or not. It is also an objective of the invention to provide such a dry drop whose maintenance could be executed rapidly and easily without the need for removing the drop off the networks, even temporarily.

It is a further objective of the invention to provide such a dry drop that ensures, at the level of the sprinkler, a total release of the nozzle from the connector in the event of burst of the fuse.

In that sense, it is an objective of the invention to guarantee a minimum trigger time of the actuator of a "vacuum" system in all circumstances.

These objectives, as well as others which will appear later on, are achieved thanks to the invention whose object is a dry drop intended to be mounted in a fire protection vacuum installation, the drop including a sprinkler, the dry drop also comprising:

a tubular body defining an inner chamber, and having:
- a first end having:
  - first means for connection to a piping of the fire protection installation,
  - a first nozzle adapted to ensure the link between the dry drop and the piping;
- a second end having:
  - a second nozzle adapted to ensure the link between the dry drop and the sprinkler of the type having:
    - a fastening connector, allowing linking the sprinkler to second connection means, having a complementary nozzle;
    - a fuse;
    - a cap for shutting off the complementary nozzle, held in the shutoff position by the fuse;
  - second means for connection to the sprinkler;
- an orifice located between the first end and the second end;

a shutter movable between:
- a shutoff position in which it shuts off the first nozzle;
- a passage position in which it is cleared from the first nozzle;

means for biasing the shutter in its passage position, interposed between the tubular body and the shutter, characterized in that it comprises a one-way valve intended to be mounted in the orifice, the shutter being held in its shutoff position by the pressurized gas and the sprinkler.

Such a dry drop allows avoiding the presence of ice in the network while ensuring operation in all circumstances.

Indeed, when the fuse of the sprinkler linked to the dry drop is intact, the cap remains held against the second nozzle. Similarly, the pressure prevailing in the inner chamber ensures holding of the shutter in its shutoff position. Consequently, the depression due to the vacuum in the network is preserved and maintained and the inner chamber of the dry drop remains pressurized, thereby preventing the creation of ice in the drop.

When the fuse of the sprinkler breaks up, the cap is no longer held shutting off the second nozzle, and the pressure prevailing in the chamber ensures ejection thereof. The pressure in the inner chamber then drops abruptly until reaching the atmospheric pressure, or, at the very least, the pressure of the environment in which the fire extinction vacuum network is mounted. The shutter is then cleared from the first nozzle by the biasing means so as to generate a rise in pressure in the vacuum network and trigger sending of water to sprinkle the or each triggered area.

Thus, it is possible to use vacuum-type sprinklers free of any means for ejecting the cap since the pressure prevailing in the chamber enables the ejection of the cap as of the break-up of the fuse.

Moreover, the rearmament of the fire extinction vacuum network is ensured by the ease of set-up or a new dry drop equipped with a sprinkler whose fuse is intact, and then the generation of vacuum in the vacuum network. Such rearmament is simple and quick to carry out.

According to an advantageous embodiment, the drop comprises a handling tool, and the shutter has hooking means intended to cooperate with the tool accessible from outside to position the shutter in its shutoff position.

Thus, prior to the pressurization of the inner chamber, it is possible to manually pre-position the shutter and hold it in the shutoff position. When the inner chamber is pressurized, it is then possible to release the tool, the pressure prevailing in the inner chamber then being sufficient to hold the shutter in its shutoff position.

Moreover, the tool allows checking up the proper operation of the biasing means prior to the pressurization of the inner chamber.

In this case, the hooking means are advantageously in the form of a piercing formed in the shutter.

The piercing is simple to make and allows exerting a tensioning of the shutter against the biasing means which exert an effort to urge the shutter in its passage position.

Preferably, the tool has:
- a gripping portion intended to be grasped by a user;
- a hooking portion intended to cooperate with the hooking means of the shutter.

Such a tool may be dedicated and designed specifically for the dry drop according to the invention. Indeed, the hooking portion is developed so as to be able to be introduced into the hooking means of the shutter, whereas the gripping portion may be designed on the one hand to facilitate gripping of the tool, but also to be able to remain in place in the pipes of the vacuum network when the dry drop is mounted on said network. The gripping portion will then be drawn so as not to prevent the flow of water when a fire shall be fought. In other words, when water flows, the tool, if it remains in place in the vacuum network, shall not form any hindrance to the passage of water, which would be detrimental to the proper control of the fire.

Advantageously, the pressure in the inner chamber is comprised between 6 bars and 14 bars.

Even more advantageously, the pressure in the inner chamber is comprised between 8 bars and 12 bars.

Such a pressure range allows ensuring the proper operation of the fire extinction vacuum network.

Indeed, this pressure range ensures holding of the shutter in its shutoff position, that is to say against the biasing means, while avoiding the fuse being subjected to an excessively high pressure constraint. An excessively high pressure constraint applied on the fuse could then generate a risk of break-up of the fuse at the slightest shake or at the slightest contact (even though light) with an object for example.

Preferably, the gas injected into the inner chamber is nitrogen.

Such a gas has the advantage of being completely free of water particles such that it allows ensuring that no frost or ice forms inside the drop.

According to a particular embodiment, the one-way valve is a Schrader-type (registered trademark) valve.

Such a valve is common and therefore simple to operate and to replace in the event of failure. Moreover, such a valve being widespread in the market, it is suitable for the pressurization of the inner chamber by all means for connection to a gas source, or almost.

The invention also concerns a method for mounting a dry drop as previously described, on a fire extinction vacuum network, characterized in that it comprises the steps of:
- mounting a sprinkler at the second end of the tubular body so that the second nozzle is shut off by the shutoff cap of the sprinkler;
- positioning the shutter in its shutoff position using a tool and/or by gravity;
- injecting a gas into the inner chamber by the one-way valve to pressurize the inner chamber and hold the shutter in the shutoff position;
- mounting the dry drop on a pipe of a fire extinction vacuum network.

Such a method is simple and quick to implement and does not require any particular tools.

The invention further concerns a fire protection installation, comprising:

a piping;

at least one dry drop as previously described, connected to the piping by a first end, and at least one vacuum sprinkler mounted on a second end of the dry drop.

BRIEF DESCRIPTION OF THE DRAWINGS

Other features and advantages of the invention will appear more clearly on reading the following description of preferred embodiments of the invention, provided as illustrative and non-limiting examples, and from the appended drawings among which.

DETAILED DESCRIPTION OF ILLUSTRATIVE EMBODIMENTS

Figure 1:
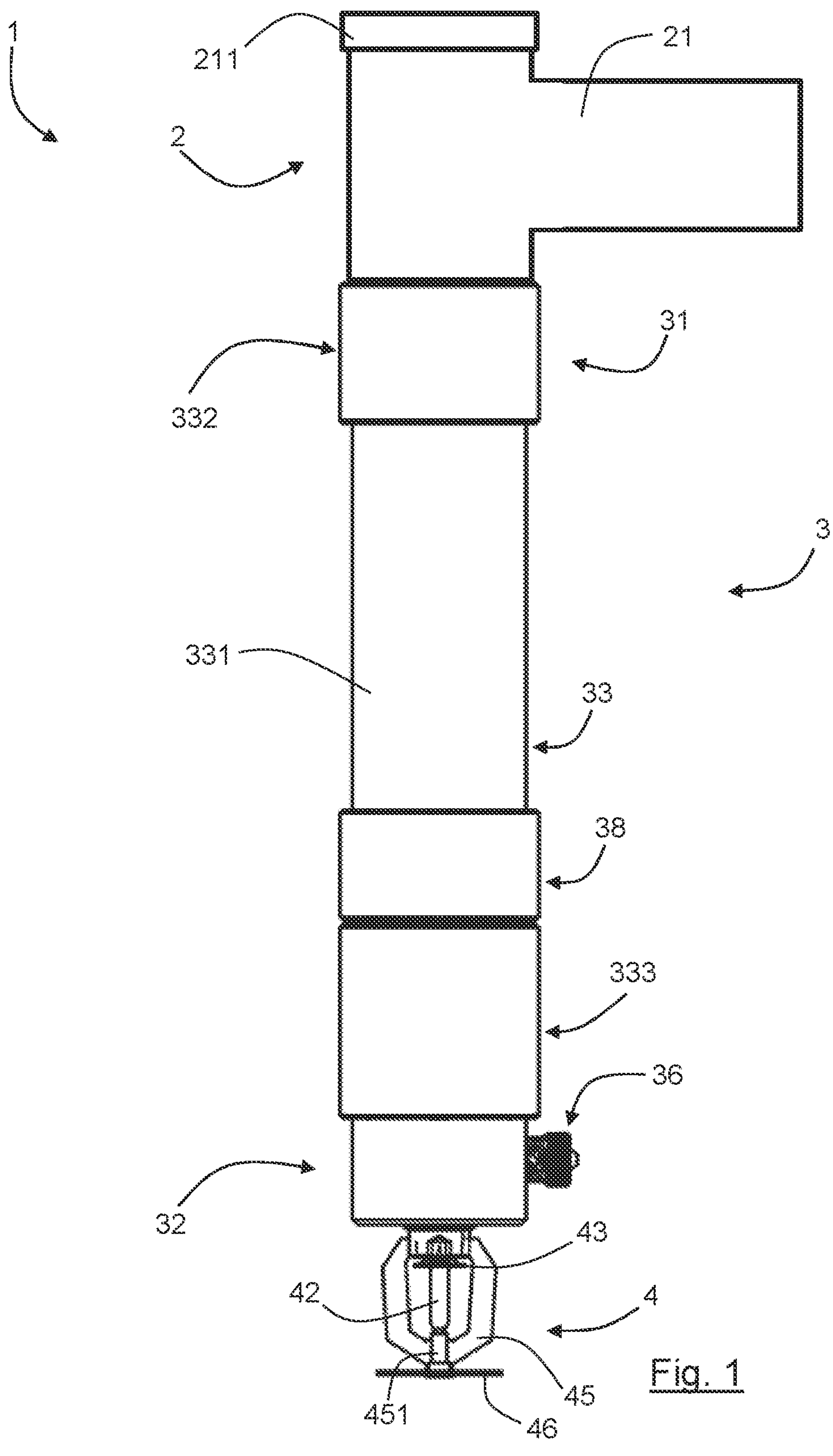
FIG. 1 is a front view of a portion of a fire protection installation, comprising a dry drop according to the invention.

FIG. 1 illustrates a portion of a fire protection installation 1 comprising:

a vacuum network 2 comprising a piping 21;

at least one dry drop 3 according to the invention (one single dry drop 3 being represented in FIG. 1);

a sprinkler 4.

More specifically, the dry drop 3 has a first end 31 by which it is connected to the piping 21 of the vacuum network, and a second end 32, opposite to the first end 31, on which the sprinkler 4 is mounted.

Figure 2:
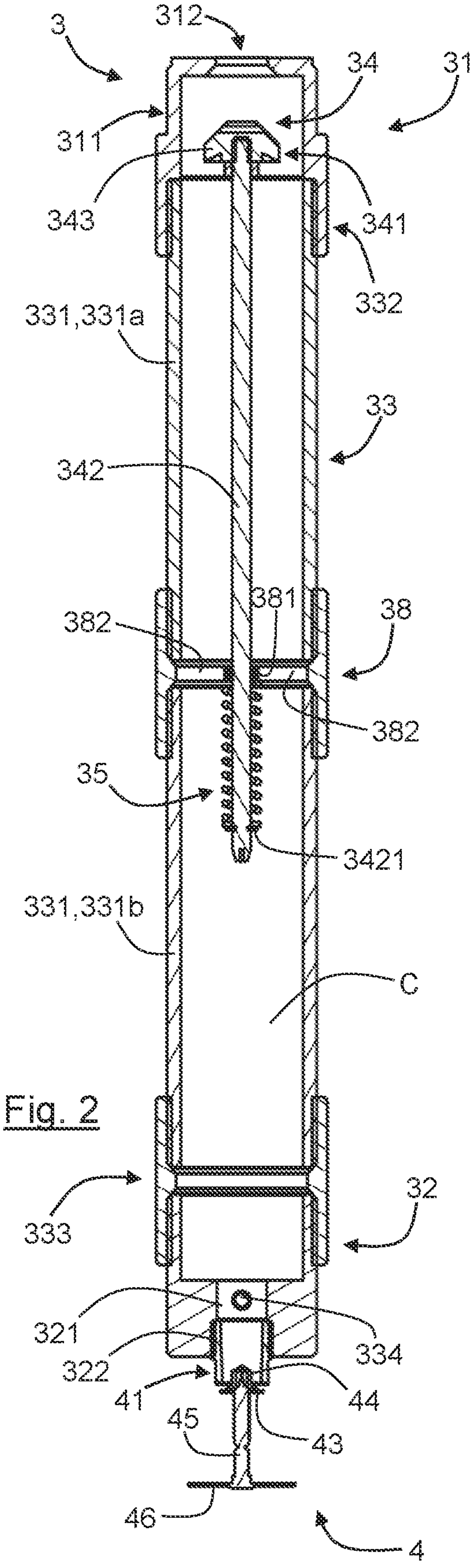
FIG. 2 is a longitudinal sectional view of a dry drop according to the invention.

Referring to FIG. 2, the dry drop 3 according to the invention comprises:

a tubular body 33 defining an inner chamber C;

a shutter 34;

biasing means 35;

a one-way valve 36;

a tool 37 for handling the shutter 34 (illustrated in FIG. 3), accessible from outside the dry drop 3.

The tubular body 33 comprises a hollow tube 331 closed by a first sleeve 332 forming the first end 31 of the dry drop 3, and by a second sleeve 333 forming the second end 32 of the dry drop 3.

The first sleeve 332 and the second sleeve 333 are secured to the hollow tube 33 by screwing, welding, gluing or force fitting.

According to a preferred embodiment, in particular as illustrated in FIG. 2, the hollow tube 331 comprises a first portion 331*a* and a second portion 331*b* extending coaxially in the continuation of one another.

The first portion 331*a* and the second portion 331*b* of the hollow tube 331 are linked to one another by an intermediate sleeve 38. The first portion 331*a* and the second portion 331*b* may be screwed on the intermediate sleeve 38 or else be forcibly fitted into the sleeve 38.

The first end 31 has:

first means for connection 311 to the piping 21 of the installation 1;

a first nozzle 312.

In particular, the first connection means 311 are in the form of a tapped portion of the first sleeve 332, intended to be helically engaged with a threaded portion of the piping 21. In other words, the first connection means 311 form a male part intended to be introduced into a female part formed by a portion of the piping 21.

The second end 32 has:

a second nozzle for ensuring the link between the dry drop 3 and the sprinkler 4;

second means for connection 322 to the sprinkler 4.

In particular, the connection means 322 are in the form of a threaded portion of the second sleeve 333, intended to receive a portion of the sprinkler 4 as explained hereinafter. In other words, the second connection means 322 form a female part intended to receive a male part formed by a portion of the sprinkler 4.

The tubular body 33 further has an orifice 334 between its first end 31 and its second end 32.

More specifically, the orifice 334 is formed in an upper portion of the second sleeve 333 and allows setting the inner chamber C in communication with the outside of the dry drop 3.

As explained hereinafter, the orifice 334 is intended to receive the one-way valve 36 to enable the fluidic communication only in one direction between the inner chamber C and the outside of the dry drop 3.

Advantageously, the one-way valve 36 is a Schrader-type (registered trademark) valve.

The shutter 34 comprise a head 341 and a rod 342 secured to the head 341.

Figure 3:
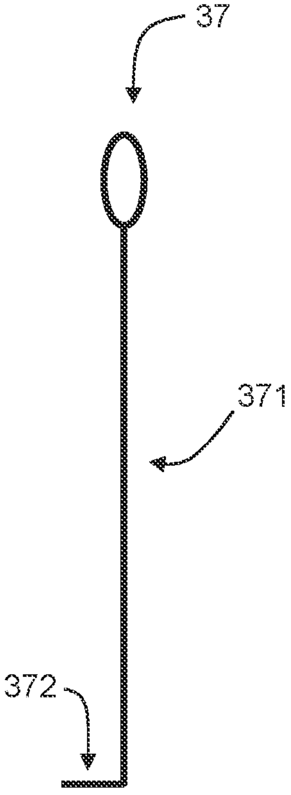
FIG. 3 is a front view of a tool for handling a shutter of the dry drop according to the invention.
Figure 4:
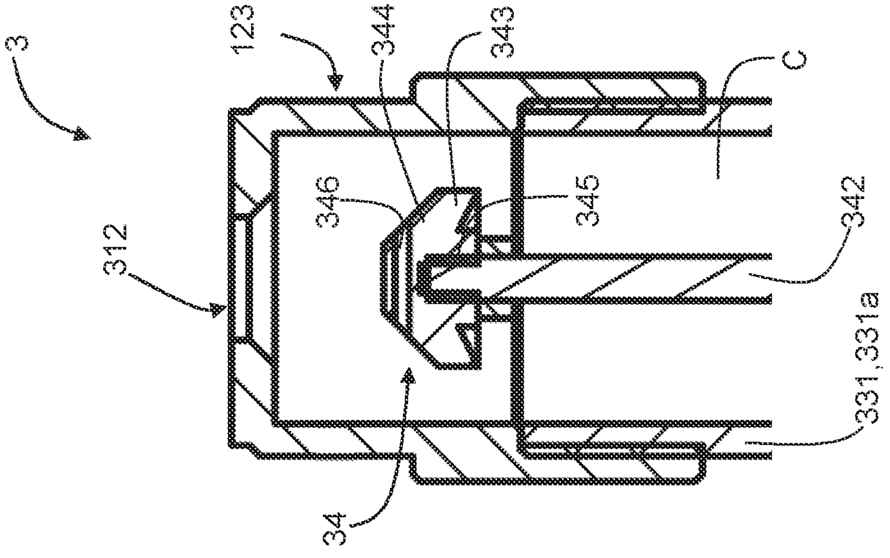
FIG. 4 is a longitudinal sectional detail view of an upper portion of the dry drop according to the invention.

FIGS. 2, 3 and 4 illustrate two variants of the head 341.

The head 341 has a cylindrical portion 343 topped with a frustoconical portion 344.

The frustoconical portion 344 gradually tapers off starting from the cylindrical portion 343 and is intended to tightly cooperate with the first nozzle 312 as explained hereinafter.

The cylindrical portion 343 has, at the center thereof, a housing 345 opening opposite to the frustoconical portion 344, this housing 345 being intended to receive the rod 342.

According to a preferred embodiment illustrated in FIGS. 2 and 4, the frustoconical portion 344 of the head 341 is provided with hooking means in the form of a piercing 346 (FIG. 4) intended to receive the tool 37 illustrated in FIG. 3, to enable handling of the shutter 34 as explained hereinafter.

To this end, the tool 37 comprises:

a gripping portion 371, intended to be grasped by a user;

a hooking portion 372 intended to cooperate with the hooking means of the shutter 34, by being inserted into the piercing 346.

The biasing means 35 are in the form of a tension spring mounted around the rod 342 of the shutter 34.

More particularly, the biasing means 35 are mounted between a stop 3421 of the rod 342 and a guide journal 381 of the intermediate sleeve 38.

Figure 5:
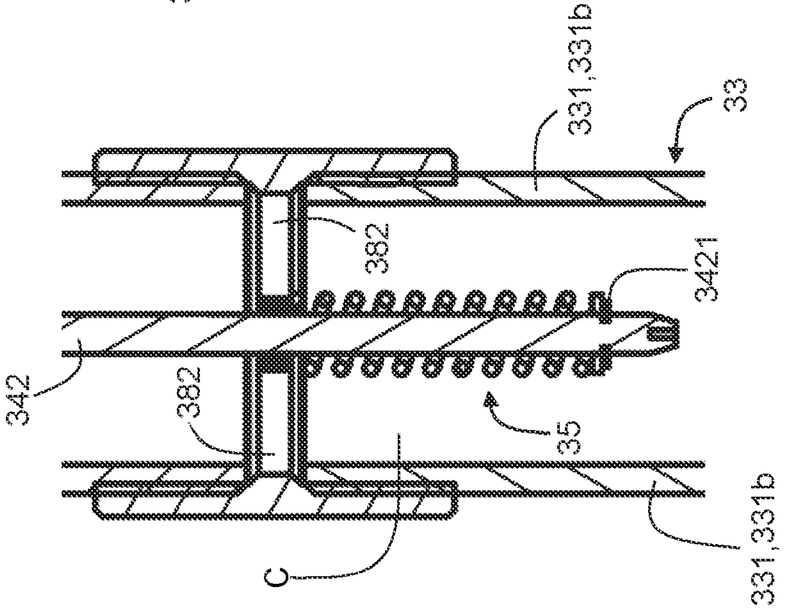
FIG. 5 is a longitudinal sectional detail view of a central portion of the dry drop according to the invention.

As illustrated in FIG. 5, the intermediate sleeve 38 has, to this end, a sleeve forming the guide journal 381 and at least two centering arms 382 for linking the sleeve to the tubular body of the intermediate sleeve 38, in which the first portion 331*a* and the second portion 331*b* of the hollow tube 331 are received.

When the shutter 34 is in its shutoff position, the spring of the biasing means 35 is compressed whereas, when the shutter 34 is in its passage position, the spring of the biasing means 35 is in its rest position, as illustrated in FIGS. 2 and 5.

Figure 6:
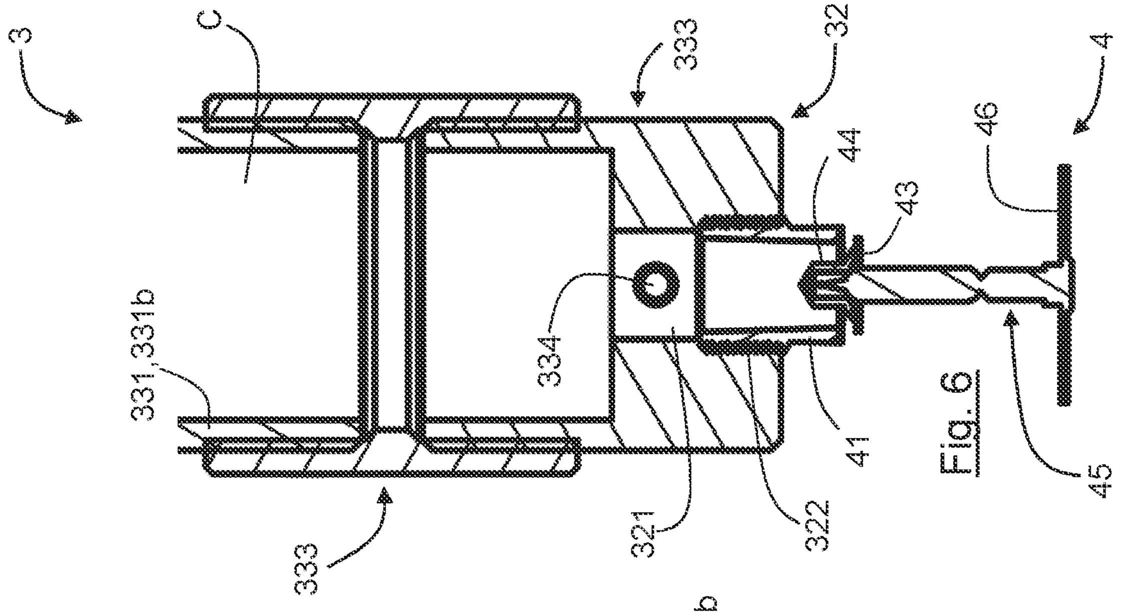
FIG. 6 is a longitudinal sectional detail view of a lower portion of the dry drop according to the invention.

The sprinkler 4, shown in particular in FIGS. 1 and 6, is a sprinkler of the type having:

- a fastening connector 41, allowing linking the sprinkler 4 to the second connection means 322;
- a fuse 42;
- a shutoff cap 43.

The fastening connector 41 has:

- an external tapping intended to cooperate with a thread of the second sleeve 333 of the dry drop 3;
- a complementary nozzle 44 enabling the passage of water from the dry drop 3 to the outside, as explained hereinafter.

The shutoff cap 43 is intended to shut off the complementary nozzle 44, by being held in the shutoff position by the fuse 42 as illustrated in FIG. 1.

The sprinkler 4 further comprises a U-shaped yoke 45 having a first end by which it is linked to the fastening connector 41, and a second end comprising a base 451 on which the fuse 42 rests.

Moreover, the sprinkler 4 comprises a deflector 46 mounted at the second end of the yoke 41, to allow diverting water, at least partially, in order to cover a large water sprinkling area.

Finally, the sprinkler 4 may comprise means for ejecting the shutoff cap 43 during the break-up of the fuse 42, these ejection means not being represented in the figures.

Mounting of a dry drop 3 according to the invention on a vacuum network 2 of a fire protection installation 1, comprises the steps of:

- mounting the sprinkler 4 at the second end 32 of the tubular body 33 so that the second nozzle 321 is shut off by the shutoff cap 43 of the sprinkler 4;
- positioning the shutter 34 in its shutoff position using the tool 37 and/or by gravity;
- injecting a gas into the inner chamber C through the one-way valve 36 to pressurize the inner chamber C and hold the shutoff cap 34 in position;
- mounting the dry drop 3 on a pipe 21 (in this instance in the form of a T-fitting in the vertical position) of a fire extinction vacuum network 2.

Advantageously, the gas injected into the inner chamber C is nitrogen. The injection pressure is such that the pressure prevailing in the inner chamber is comprised between 6 bars and 14 bars, following the injection of the gas.

Preferably, the pressure prevailing in the inner chamber C, following the injection of the gas, is comprised between 8 bars and 12 bars.

For clarity, it is specified that FIG. 2 illustrates the dry drop 3 before pressurization of the inner chamber C, and that FIGS. 4 and 5 illustrate the dry drop 3 before pressurization of the inner chamber C or after triggering of the firefighting installation.

To ensure the pressurization of the inner chamber C, the tool 37 is used so as to manually hold the shutter 34 in its shutoff position before and after the injection of nitrogen into the inner chamber C, through the one-way valve 36. When the inner chamber C is pressurized, the pressure prevailing in the inner chamber C ensures holding of the shutter 3 in the shutoff position, against the compression spring of the biasing means 35.

When a fire starts, the temperature of the room in which the fire is located increases until reaching a substantially high temperature that causes the fuse 42 to break up. The break-up of the fuse 42 then causes the release of the shutoff cap 43. The shutoff cap 43 is then ejected from the complementary nozzle 44 thanks to the pressure prevailing in the inner chamber C and, to the ejection means, where appropriate.

The pressure in the inner chamber C then decreases until reaching the pressure of the room in which the dry drop 3 is located.

Concomitantly with the decrease of the pressure in the inner chamber C, the spring of the biasing means 35 acts on the shutter 34 to position it in its passage position.

Suction in the pipes 21 of the vacuum network 2 then causes the change of state of an actuator which, in turn, opens a water supply general valve. This results in water overwhelming, rapidly and without hindrance, the entire installation 1 up to the sprinklers 4, water flowing through the sprinkler(s) 4 whose fuse 42 has burst.

Once the fire is under control, the installation may be rearmed without changing the dry drops 3 on the vacuum network 2, and by drawing vacuum in all of the pipes 21 of the installation 1.

To this end, a dry drop 3 according to the invention is reusable unlike dry drops 3 of the prior art. When a dry drop 3 according to the invention is used in a cold room, this allows avoiding damaging the insulation means of the cold room since the dry drop 3 according to the invention remains in position on the vacuum network 2.

For rearmament, all it needs then is to:

- remount a sprinkler 4 at the second end 32 of the tubular body 33;
- remove a plug 211 from an end of the T-fitting of the pipe 21, opposite to the dry drop 3;
- slip the tool 37 into the opening uncovered by removal of the plug 211 of the T-fitting so as to reach the shutter 34 to position it in its first position;
- pressurize the inner chamber C;
- remove the tool 37;
- reposition the plug 211 on the T-fitting so as to close the pipe 21 again;
- draw vacuum in the vacuum network 2.

Figure 7:
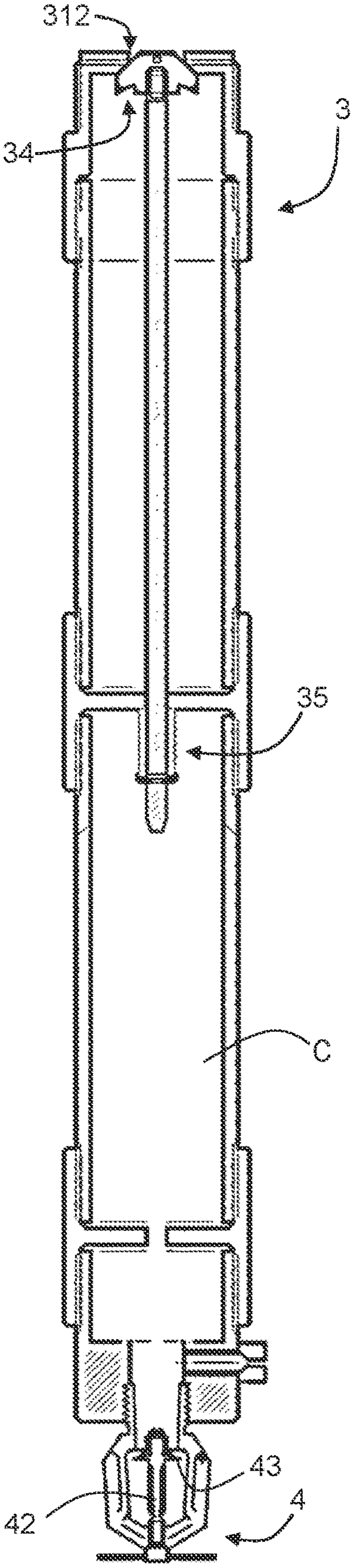
FIG. 7 is a longitudinal sectional view of a dry drop according to the invention, in the armed configuration.
Figure 8:
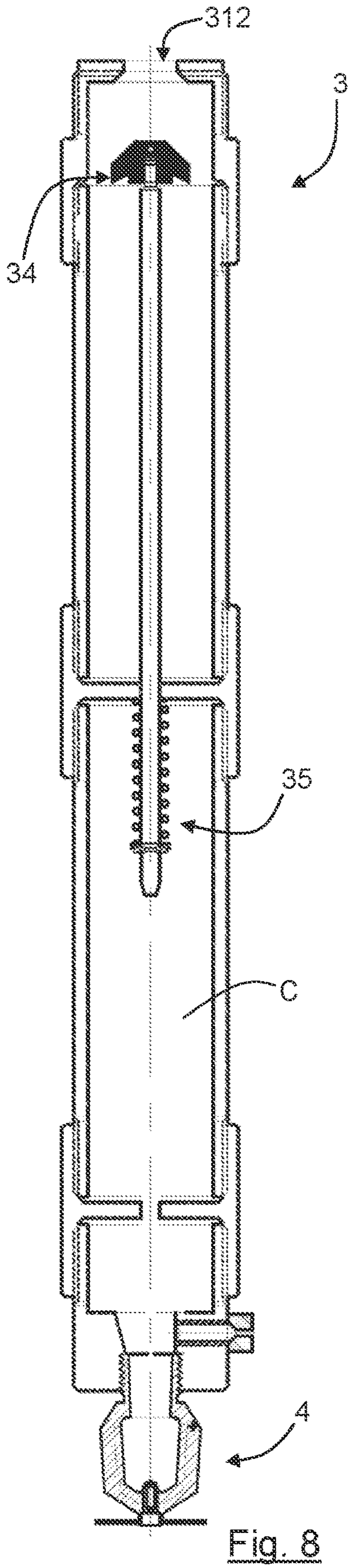
FIG. 8 is a longitudinal sectional view of a dry drop according to the invention, in the disarmed configuration.

FIGS. 7 and 8 illustrate a drop 3 in a longitudinal section, in the armed configuration and in the disarmed configuration, respectively.

More specifically, when the dry drop 3 is in the armed configuration, that is to say when the inner chamber C is pressurized, the spring of the biasing means 35 is compressed and the shutter 34 shuts off the first nozzle 312. Moreover, in this armed configuration, the shutter 43 of the sprinkler is held in position by the fuse 42 so as to maintain the pressure in the inner chamber C.

In contrast, when the dry drop 3 is in the disarmed configuration, that is to say when the inner chamber C is no longer pressurized, the spring of the biasing means 35 is no longer compressed and the shutter 34 is cleared from the first nozzle 312. Moreover, in this disarmed configuration, the fuse 42 having burst, the shutter 43 is ejected from the sprinkler 4 by the pressure of the inner chamber C so as to clear the passage of water from the pipe 21 (FIG. 1) up to the fire area.

Thus, an advantage of the dry drop 3 according to the invention lies in that the dry drop is reusable without having to be dismounted from the vacuum network 2 for disarmament thereof and rearmament of the firefighting installation.

Another advantage of the dry drop 3 according to the invention lies in that the drop is easily adaptable to sprinklers 4 of different sizes. Indeed, a simple dimensioning of the second end of the dry drop 3. This second end 32 being formed by the second sleeve 333, all it needs then is to change the second sleeve 333 with a sleeve suited to the sprinkler 4 to be installed.

Although the present disclosure has been described with reference to one or more examples, workers skilled in the art will recognize that changes may be made in form and detail without departing from the scope of the disclosure and/or the appended claims.

The invention claimed is:

1. A dry drop configured to be mounted in a fire protection vacuum installation, the dry drop comprising:
- a sprinkler;
- a tubular body defining an inner chamber, and having:
  - a first end having:
    - a first connector for connection to a piping of the fire protection installation,
    - a first nozzle adapted to ensure a link between the dry drop and the piping;
  - a second end having:
    - a second nozzle adapted to ensure a link between the dry drop and the sprinkler and having:
      - a fastening connector, allowing linking the sprinkler to a second connector and having a complementary nozzle;
      - a fuse;
      - a cap for shutting off the complementary nozzle, held in a shutoff position by the fuse;
    - the second connector to the sprinkler;
  - an orifice located between the first end and the second end;
- a shutter, which comprises a head and a rod integral with the head and which is movable between:
  - a shutoff position in which the shutter shuts off the first nozzle;
  - a passage position in which the shutter is cleared from the first nozzle;
- a biasing element, which comprises a tension spring mounted around the rod of the shutter and which biases the shutter in the passage position and is interposed between the tubular body and the shutter;
- a one-way valve to be mounted in the orifice; and
- a handling tool, and wherein the shutter has a hook designed to cooperate with the handling tool and accessible from outside to position the shutter in the shutoff position, and
- the inner chamber being configured to comprise a pressurized gas, the shutter being configured to be held in the shutoff position by pressurized gas and the sprinkler.

2. The dry drop according to claim 1, wherein the hook is in the form of a piercing formed in the shutter.

3. The dry drop according to claim 1, wherein the tool has:
- a gripping portion to be grasped by a user;
- a hooking portion to cooperate with the hook of the shutter.

4. The dry drop according to claim 1, wherein the inner chamber comprises the pressurized gas and a pressure of the gas in the inner chamber is comprised between 6 bars and 14 bars.

5. The dry drop according to claim 4, wherein the pressure in the inner chamber is comprised between 8 bars and 12 bars.

6. The dry drop according to claim 1, wherein the inner chamber comprises the pressurized gas and the pressurized gas is nitrogen.

7. A method comprising:
- mounting a dry drop on a fire extinction vacuum network, wherein the dry drop comprises:
  - a tubular body defining an inner chamber and having:
    - a first end having:
      - a first connector for connection to a piping of the fire protection installation,
      - a first nozzle adapted to ensure a link between the dry drop and the piping;
    - a second end having:
      - a second nozzle adapted to ensure a link between the dry drop and a sprinkler and having:
        - a fastening connector, allowing linking the sprinkler to a second connector and having a complementary nozzle;
        - a fuse;
        - a cap for shutting off the complementary nozzle, held in a shutoff position by the fuse;
      - the second connector;
    - an orifice located between the first end and the second end;
  - a shutter, which comprises a head and a rod integral with the head and which is movable between:
    - a shutoff position in which the shutter shuts off the first nozzle;
    - a passage position in which the shutter is cleared from the first nozzle;
  - a biasing element, which comprises a tension spring mounted around the rod of the shutter and which biases the shutter in the passage position and is interposed between the tubular body and the shutter;
  - a one-way valve to be mounted in the orifice; and
  - a handling tool, and wherein the shutter has a hook designed to cooperate with the handling tool and accessible from outside to position the shutter in the shutoff position, and
  - the inner chamber configured to comprise a pressurized gas, the shutter being configured to be held in the shutoff position by pressurized gas and the sprinkler;
- wherein the mounting comprises:
- mounting the sprinkler at the second end of the tubular body so that the second nozzle is shut off by the shutoff cap;
- positioning the shutter in the shutoff position using the handling tool;
- injecting the gas into the inner chamber by the one-way valve to pressurize the inner chamber and hold the shutter in the shutoff position; and
- mounting the dry drop on a pipe of the fire extinction vacuum network.

8. A fire protection installation, comprising:
- a vacuum network comprising a piping;
- at least one dry drop connected to the piping, wherein the dry drop comprises:
  - a tubular body defining an inner chamber and having:
    - a first end having:
      - a first connector for connection to a piping of the fire protection installation,
      - a first nozzle adapted to ensure a link between the dry drop and the piping;
    - a second end having:
      - a second nozzle adapted to ensure a link between the dry drop and at least one vacuum sprinkler and having:
        - a fastening connector, allowing linking the at least one vacuum sprinkler to a second connector and having a complementary nozzle;

a fuse;

a cap for shutting off the complementary nozzle, held in a shutoff position by the fuse;

the second connector;

an orifice located between the first end and the second end;

a shutter, which comprises a head and a rod integral with the head and which is movable between:

a shutoff position in which the shutter shuts off the first nozzle;

a passage position in which the shutter is cleared from the first nozzle;

a biasing element, which comprises a tension spring mounted around the rod of the shutter and which biases the shutter in the passage position and is interposed between the tubular body and the shutter;

a one-way valve mounted in the orifice; and a handling tool, and wherein the shutter has a hook designed to cooperate with the handling tool and accessible from outside to position the shutter in the shutoff position, and the inner chamber comprising a pressurized gas, the shutter being held in the shutoff position by pressurized gas and the at least one vacuum sprinkler; and the at least one vacuum sprinkler mounted on the second end of the dry drop.

* * * * *